Figure 1:
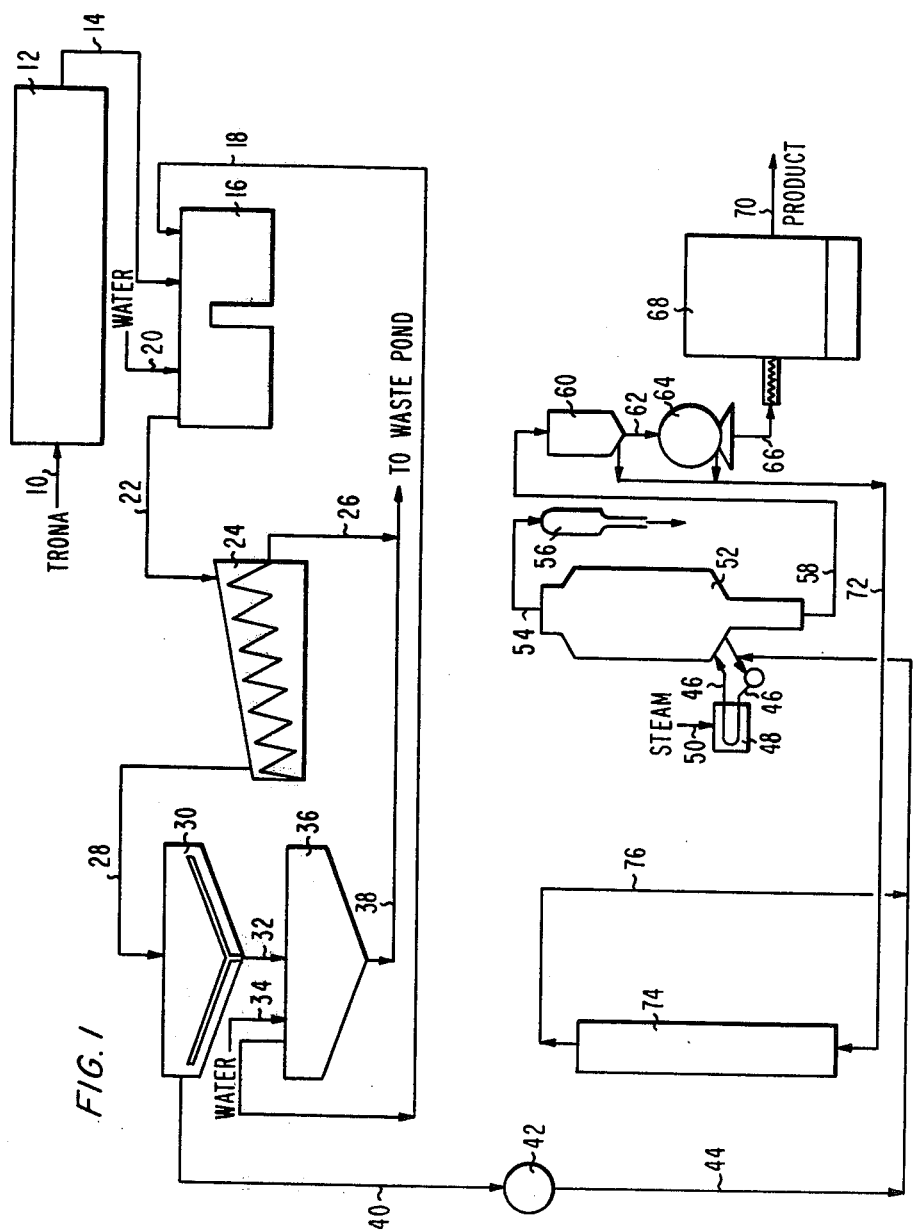

United States Patent [19]

Ilardi et al.

[11] 4,299,799
[45] Nov. 10, 1981

[54] CARBON TREATMENT OF MONOHYDRATE CRYSTALLIZER LIQUOR

[75] Inventors: Joseph M. Ilardi, South Brunswick, N.J.; Richard W. Waggener, Green River, Wyo.; William R. Frint, Berwin, Pa.

[73] Assignee: Intermountain Research & Develop. Corp., Green River, Wyo.

[21] Appl. No.: 138,484

[22] Filed: Apr. 9, 1980

Related U.S. Application Data

[63] Continuation of Ser. No. 858,929, Dec. 9, 1977, abandoned, which is a continuation of Ser. No. 751,788, Dec. 16, 1976, abandoned.

[51] Int. Cl.³ .................... C01D 7/00; C22B 26/10
[52] U.S. Cl. ............................. 423/206 T; 423/421; 23/302 T
[58] Field of Search ............ 423/206 T, 186, 189, 423/188, 190, 195, 203, 205, 421, 422; 23/302 T

[56] References Cited

U.S. PATENT DOCUMENTS

| | | | |
|---|---|---|---|
| 2,770,524 | 11/1956 | Seaton | 423/206 T |
| 3,260,567 | 7/1966 | Hellmers et al. | 423/206 T |
| 3,528,766 | 9/1970 | Coglaiti, Jr. et al. | 423/206 T |
| 3,725,014 | 5/1973 | Poncha | 423/206 T |
| 3,927,175 | 12/1975 | Garofano et al. | 423/206 T |
| 3,933,977 | 1/1976 | Ilardi et al. | 423/206 T |
| 4,039,618 | 8/1977 | Gancy et al. | 423/186 |

Primary Examiner—Gary P. Straub
Attorney, Agent, or Firm—Christopher Egolf

[57] ABSTRACT

Improved process for preparing sodium carbonate from crude trona without carbon column scaling by evaporating a portion of water from a clarified sodium carbonate solution to crystallize sodium carbonate crystals therefrom, separating the sodium carbonate crystals from the crystallizer liquor, passing only the crystallizer liquor which contains organic impurities through a carbon column to reduce the organic impurity concentration therein, and evaporating a portion of water from the carbon treated crystallizer liquor to crystallize additional sodium carbonate crystals.

7 Claims, 1 Drawing Figure

CARBON TREATMENT OF MONOHYDRATE CRYSTALLIZER LIQUOR

This is a continuation of application Ser. No. 858,929, filed Dec. 9, 1977 which is a continuation of application Ser. No. 751,788, filed Dec. 16, 1976 both applications now abandoned.

This invention relates to an improved process for the production of sodium carbonate (soda ash) from crude trona.

In Sweetwater and adjacent counties in the vicinity of Green River, Wyo., trona deposits are found at depths ranging from about 800 to about 1800 feet underground. The main trona bed varies from 8 to 18 feet in thickness and other beds of less thickness separated by layers of shale are usually found above the main trona bed. The trona consists mainly of sodium sesquicarbonate ($Na_2CO_3.NaHCO_3.2H_2O$) and four to six percent insoluble materials consisting mainly of shale. A typical analysis of the crude trona from which the larger pieces of shale have been removed is:

| Constituent | Percent |
|---|---|
| $Na_2CO_3$ | 43.50 |
| $NaHCO_3$ | 36.11 |
| $H_2O$ | 13.14 |
| $Na_2SO_4$ | 0.02 |
| NaCl | 0.09 |
| $Fe_2O_3$ | 0.14 |
| Organic Matter | 0.30 |
| Insolubles | 6.70 |

Various processes for the production of sodium carbonate from crude trona are known. One such process is the monohydrate process, disclosed in U.S. Pat. No. 2,962,348, issued to Seglin et al on Nov. 29, 1960. In this process, crude trona, after being crushed and screened, is calcined directly to form crude sodium carbonate. The crude sodium carbonate is dissolved in an aqueous solvent to form a substantially saturated solution of crude sodium carbonate The crude sodium carbonate solution is then clarified and/or filtered to remove insolubles and subsequently crystallized, preferably in evaporative crystallizers to form sodium carbonate monohydrate. The monohydrate crystals are then calcined to produce a dense soda ash.

One difficulty that has arisen in the operation of the monohydrate process has been the build-up of soluble organic impurities in the crude sodium carbonate solution during crystallization of the sodium carbonate. These organic impurities consist mainly of kerogenaceous material such as carboxylic acids and rosin acids present in the trona. The presence of appreciable amounts of the organic impurities during crystallization should be avoided since the impurities adversely affect sodium carbonate monohydrate crystal quality by discoloring the crystals, by producing crystals of unacceptable low bulk density, and by forming elongated crystals which cannot be handled easily. Furthermore, crystal quality becomes increasingly worse as the organic impurity concentration increases.

A subsequent modification of the monohydrate process involved the installation of carbon towers to treat clarified sodium carbonate solution with activated carbon prior to crystallization to remove a substantial portion of the soluble organic impurities (see U.S. Pat. No. 2,770,524). U.S. Pat. No. 3,260,567 also discloses carbon treatment of a solution containing the clarified sodium carbonate solution and a portion of recycled evaporated mother liquor. Unfortunately, column scaling difficulties have been encountered in the use of carbon columns for treating clarified sodium carbonate solutions. Scaling occurs from precipitation of pirssonite ($Na_2CO_3.CaCo_3.2H_2O$), analcite ($Na_2O.Al_2O_3.4SiO_2.2H_2O$), and other insoluble compounds on the carbon. As precipitation takes place, the activated carbon loses its effectiveness because it becomes coated and sealed off from the solution. In the commonly used packed-bed carbon columns, scale formation also cements the carbon particles together, thereby retarding solution flow and making carbon removal for regeneration purposes extremely difficult.

As a result of these deficiencies, it has become desirable to develop a carbon treatment system for sodium carbonate solutions which would remove the maximum amount of soluble organic impurities per volume of solution treated while minimizing scaling on the activated carbon.

It has been unexpectedly discovered that carbon column treatment of carbonate process solutions, that is, aqueous solutions containing sodium carbonate, can be most effectively carried out by using crystallizer liquor as the sole feed through the carbon columns. A process for preparing sodium carbonate from crude trona is performed by calcining crude trona at a temperature and for a time sufficient to convert the crude trona into crude sodium carbonate; mixing the crude sodium carbonate in an aqueous liquor to form an aqueous solution of crude sodium carbonate containing suspended insolubles and soluble organic impurities; clarifying the crude sodium carbonate solution to remove suspended insolubles; evaporating a portion of water from the clarified sodium carbonate solution to crystallize sodium carbonate crystals therefrom; separating the sodium carbonate crystals from the crystallizer liquor containing organic impurities; passing the crystallizer liquor containing organic impurities through a carbon column to reduce the organic impurities present in the crystallizer liquor; mixing the carbon treated crystallizer liquor with a sodium carbonate solution; and evaporating a portion of water from the mixed liquor to crystallize sodium carbonate crystals therefrom; and separating the sodium carbonate crystals from the mixed liquor.

In the drawing, there is illustrated diagrammatically one embodiment for the production of sodium carbonate from trona by passing crystallizer liquor through a carbon column.

In the process of the invention, crude trona is dry-mined and processed to crude sodium carbonate by calcining and converting the sodium sesquicarbonate present in the crude trona to sodium carbonate. This reaction may be presented as follows:

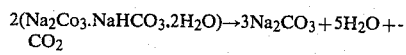

The crude dry-mined trona may be prepared for calcination by crushing the mined trona in a crushing apparatus and passing the crushed trona over a screening device or other suitable sizing equipment. Particles in the general size range smaller than one inch are collected and passed to the calciner. Rejected oversize particles may then be recycled to the crushing apparatus for further crushing and screening. Proper sizing of the crude trona insures good conversion of the sodium sesquicarbonate therein to sodium carbonate, since oversized particles are not easily converted in the calciner.

The calcination of crude trona is necessary to convert sodium bicarbonate values present in the crude trona to sodium carbonate. Calcination may be carried out at any temperature which is sufficient to convert the trona to sodium carbonate. Generally, calcination temperatures on the order of 150° to 800° C. may be employed. The retention time of the crude trona in the calciner is a function of ore particle size and the temperature of the calciner. At a temperature of 400° to 800° C. and preferably 500° to 550° C., a period of about 15 minutes has been found satisfactory to obtain proper calcination of the crude trona. At a temperature of 150° to 350° C. and preferably 150° to 170° C., a period of about 50 minutes has been found satisfactory.

Calcination is usually carried out in a rotary, direct fired calciner, although other type kilns or calciners, such as vertical kilns, grate type calciners, or fluid beds are equally suitable.

After the crude trona is calcined, it is passed to the dissolving area where an aqueous liquor, such as hot water or a hot solution of sodium carbonate in water at any desired sodium carbonate concentration, is brought into contact with the crude sodium carbonate to form an aqueous solution of crude sodium carbonate. The water employed may be softened or partially softened water. In the preferred operation, the major quantity of liquid used for dissolving the crude calcined trona is recycle liquid from a subsequent stage of the process, for example, the thickener stage, and contains sodium carbonate values dissolved therein. It is also preferred that the liquid in the dissolver contain no more than 170 ppm total hardness, expressed as calcium carbonate. This avoids precipitation of calcium carbonate in the dissolvers. Calcium carbonate precipitation is most undesired because it forms a scale on dissolver equipment which is difficult to remove.

When anhydrous sodium carbonate or calcined crude trona is introduced into water or into a solution of sodium carbonate in water at a temperature above 35° C. and at or below 110° C. it hydrates to sodium carbonate monohydrate. If the solution is unsaturated, the sodium carbonate monohydrate dissolves. If the solution is saturated, the sodium carbonate monohydrate does not dissolve.

The effluent from the dissolvers, which in the preferred process of this invention is a substantially saturated solution of sodium carbonate plus suspended insolubles and soluble organic impurities, is then passed to a coarse solids classifier. In the classifier, the coarse insolubles or solids, having a particle size of about 40 mesh (U.S. Standard Sieve), are separated from the crude sodium carbonate solution which retains any undissolved or suspended insolubles smaller than about 40 mesh.

Any separator which separates coarse solids from the crude sodium carbonate may be employed. It is preferred to utilize a screw conveyor mounted in a liquid-tight, elongated container which container is mounted on an inclined angle. The inclined angle is measured from horizontal and may be from 10° to 60° C. The positioning of the container in this manner permits the lower end of the screw to be covered with the crude sodium carbonate solution while permitting the upper end of the screw to extend out of the crude solution. Such a classifier is the Denver Equipment Company Spiral Classifier Model 125.

In the operation of the coarse solids classifier, the crude sodium carbonate solution from the dissolver is fed into the intake opening of the classifier. The coarse solids immediately sink to the bottom of the classifier because of their heavy weight relative to the crude solution. The screw picks up these heavier particles resting on the bottom of the classifier and conveys them upwardly out of the solution towards a discharge chute located at the top of the classifier. The suspended insolubles smaller than about 40 mesh, soluble organic impurities and the sodium carbonate solution move to the lower end of the classifier where they are removed and passed to a clarifier where the suspended insolubles are permitted to settle out.

If a small amount of fine solid matter remains suspended in the sodium carbonate solution which has been treated in the clarifier, the sodium carbonate solution may be filtered to remove remaining insolubles.

The overflow sodium carbonate solution from the clarifier, pregnant with sodium carbonate and containing approximately 50 to 200 ppm carbon as soluble organic impurities based on the sodium carbonate solution is then passed to a crystallizer having an evaporating and crystallizing stage where water is evaporated from the sodium carbonate solution and sodium carbonate is crystallized from the solution.

In the typical crystallizing operation, the sodium carbonate solution is passed through a series of evaporators, specifically multiple effect evaporative crystallizers. When producing sodium carbonate monohydrate crystals, the sodium carbonate solution generally first enters the crystallizer operated at the highest temperature and then passes in the form of a slurry through the remaining crystallizers, each succeeding one being operated at a lower temperature than the previous one. The crystallizers are operated at temperatures of about 100° C., 75° C. and 50° C. respectively when three crystallizers are employed.

Alternatively, the sodium carbonate solution may enter the crystallizer operated at the lowest temperature and then passed in the form of a slurry through the remaining crystallizers, each succeeding one being operated at a higher temperature than the previous one.

When producing anhydrous sodium carbonate, the sodium carbonate solution is passed through an anhydrous evaporator or a series of anhydrous evaporators operating at a temperature above about 109° C.; the transition temperature of sodium carbonate. Temperatures slightly above 109° C. are preferable to higher temperatures because the former temperatures avoid the high pressures that accompany higher temperatures. Good results can be obtained at temperatures from about 110° to about 130° C. with best results obtained at temperatures from about 117° to about 126° C. These temperatures may be achieved at pressures from about 16.9 to about 33.7 psia and from about 20.7 to about 29.7 psia respectively.

As the sodium carbonate solution passes through the crystallizers, a slurry of sodium carbonate crystals and crystallizer liquor is formed. From the crystallizers, the slurry is passed to a concentrator where the slurry is treated to remove most of the crystallizer liquor remaining on the sodium carbonate crystals. The moist sodium carbonate crystals are then passed to a centrifuge to remove essentially all of the remaining crystallizer liquor. Thereafter, the crystals are heated in a dryer to remove residual moisture or heated at a temperature of about 105° to about 130° C. to convert sodium carbonate monohydrate crystals to dense sodium carbonate having bulk densities from 66 to 80 lbs/ft$^3$.

The crystallizer liquor separated from the sodium carbonate crystals in the concentrator and centrifuge contains approximately 30% dissolved sodium carbonate, about 300 to 4000 ppm carbon as soluble organic impurities based on the sodium carbonate solution, and constitutes up to 30% of the clarified sodium carbonate solution passed to the crystallizer.

The crystallizer liquor is then passed through a carbon column or series of carbon columns such as a packed-bed or expanded-bed which preferably contain powdered or granulated activated carbon as the adsorbent material.

The amount of organic impurities removed from the crystallizer liquor primarily depends upon the type of adsorbent material used, column configuration and packing which controls the hydraulic capacity of the column, liquor flow rate and organic impurity concentration. The crystallizer liquor is passed through the carbon column to remove at least 20% and preferably at least 50% of the soluble organic impurities from the crystallizer liquor. Treatment of any other sodium carbonate process solution with a carbon column is not necessary and should not be performed when carrying out the process of the invention.

An expanded bed of activated carbon refers to vertical beds of carbon that are supported at their base on a fixed support, such as a screen or perforated disc, and in which the solution to be purified is passed upwardly through the bed with sufficient velocity to expand the size of the bed within the carbon column. This requires sufficient space above the carbon bed to permit carbon expansion in the bed. It should be stressed, however, that the velocity used in the bed is not of sufficient strength to produce what is commonly termed in the art as a "fluidized bed" in which the entire bed is in a fluidized, suspended state, that is when each particle in the bed is supported by the upflowing fluid in a freely moving state. A carbon bed in a fluidized state will not remove organic impurities efficiently.

Prior and/or subsequent to passing the crystallizer liquor through the adsorbent material, the liquor is optionally filtered to remove any insoluble matter, such as sodium carbonate crystals, which will interfere with efficient operation of the column by retarding flow rates or subsequent processing operations.

The carbon treated crystallizer liquor is then passed to an evaporating and crystallizing stage where it is mixed with a sodium carbonate solution, water is evaporated by heating, and sodium carbonate is crystallized. The sodium carbonate crystals are separated from the crystallizer liquor in a conventional manner, such as a centrifugation, and dried and/or calcined to produce dense sodium carbonate having bulk densities from 60 to 80 lbs/ft$^3$.

Alternatively, the carbon treated crystallizer liquor is mixed with the clarified sodium carbonate solution and passed to a crystallizer having an evaporating and crystallizing stage where the solution is processed as heretofore described to prepare a dense sodium carbonate product.

By treating only the crystallizer liquor in a carbon column, approximately six times more soluble organic materials are removed from the liquor than can be removed by treating an equal volume of clarified sodium carbonate solution. A completely unexpected benefit derived from treating crystallizer liquor instead of clarified sodium carbonate solution is that the tendency for scaling in the carbon column is greatly reduced and no appreciable scaling in the evaporative crystallizers occurs. This is believed to be because calcium and silica salts are precipitated in the evaporative crystallizers so that there is no significant degree of supersaturation of scaling materials in the crystallizer liquor being carbon treated.

The process of the invention not only permits maximum soluble organic impurity removal with existing commercial equipment, it also permits the treatment of significantly smaller volumes of process solutions, that is, approximately two-thirds of the volume previously treated. This reduces carbon losses through attrition and the amount of liquor that must be processed. In addition, the reduction of scale formation means the carbon columns have less tendency to plug, and the carbon will retain its adsorptive capacity longer and be easier to regenerate.

Referring now to the drawing.

FIG. 1 illustrates diagrammatically one embodiment of the invention for carbon column treating crystallizer liquor according to the process of the invention.

In FIG. 1, the crude trona, crushed to a general size range of less than one inch is fed by conduit 10 to a calciner 12 where the crude trona is converted to crude sodium carbonate by heating at elevated temperatures. The gaseous products of reaction, namely water and $CO_2$, are removed from calciner 12 and vented by means not shown.

The crude sodium carbonate recovered from calciner 12, with or without cooling, is passed through conduit 14 to dissolver 16 where the sodium carbonate is dissolved in hot dissolver influent liquor to form a substantially saturated solution of sodium carbonate. The influent liquor may be water, preferably softened water supplied through conduit 20, and/or recycled solution supplied through conduit 18 from thickener 36. The temperature of the dissolver liquor is generally on the order of 85° to 95° C.

The crude sodium carbonate solution formed in dissolver 16 which contains suspended insolubles and soluble organic impurities is removed through conduit 22 and passed into coarse solids classifier 24. In classifier 24, the coarse insolubles or solids, that is solids of at least about 40 mesh, fall to the bottom of the classifier and are passed upwardly by means of a revolving screw. The sodium carbonate solution containing the organic impurities and the finer particles, that is particles having a size smaller than about 40 mesh, are removed through conduit 28 and passed to clarifier 30. The coarse solids are removed from the liquid layer through conduit 26 and sent to waste.

In clarifier 30, the sodium carbonate solution, free of coarse solids, remains in a substantially quiescent state. The insoluble fines settle and form a sludge at the bottom of the clarifier. The sludge is removed by a rotating rake and passed to thickener 36 through conduit 32. Makeup water may be added through conduit 34 and mixed with the sludge from clarifier 30 in thickener 36 to soften the makeup water. The insoluble fines settle in thickener 36 and are removed by conduit 38 to waste. Water which has been softened and contains sodium carbonate values is then removed from thickener 36 and passed through conduit 18 to dissolver 16 for use in dissolving crude sodium carbonate.

The relatively clear solution that overflows from clarifier 30 through conduit 40 is passed through filter 42 to remove additional insoluble fines.

The sodium carbonate solution is then passed through conduit 44 into crystallizer 52. The sodium carbonate solution enters a recycle circuit 46 which flows into heat exchanger 48 for heating solution passing through heat exchanger 48. Heat exchanger 48 is supplied with steam 50 to heat the solution circulating in recycle circuit 46. The heated solution is then passed into crystallizer 52 where a portion of the water is evaporated and removed through conduit 54. As a result of the evaporation, sodium carbonate is crystallized and a crystal slurry containing sodium carbonate crystals and crystallizer liquor is removed through conduit 58. The water removed through conduit 54 may be condensed in condenser 56 and piped to cooling towers or can be used as softened makeup water, as desired.

The sodium carbonate crystal slurry removed through conduit 58 is passed into concentrator 60 to remove the bulk of the crystallizer liquor remaining on the sodium carbonate crystals. The concentrated crystal slurry is removed from concentrator 60 through conduit 62 and passed into centrifuge 64 where all but very small amounts, on the order of 3%, of the crystallizer liquor is removed from the sodium carbonate crystals. The centrifuged sodium carbonate crystals are removed from centrifuge 64 through conduit 66 and passed into dryer 68 where anhydrous sodium carbonate crystals are dried and sodium carbonate monohydrate crystals are converted to dense anhydrous sodium carbonate. The crystals are removed through conduit 70 as product.

The crystallizer liquor removed from concentrator 60 and centrifuge 64 are combined and passed through conduit 72 to carbon column 74, which is preferably a packed-bed or expanded-bed containing activated carbon. A portion of the crystallizer liquor may optionally be removed from conduit 72 by means not shown and passed to waste. The carbon treated crystallizer liquor is removed from column 74 through conduit 76, and mixed with clarified sodium carbonate solution passing through conduit 44 whereupon it enters crystallizer 52.

Alternatively, carbon treated crystallizer liquor removed from column 74 through conduit 76 is passed to a second crystallizer (not shown) or passed directly into crystallizer 52 without being mixed in conduit 44.

The following example is given to illustrate the invention, but is not deemed to be limiting thereof.

EXAMPLE

Approximately ten pounds of Pittsburgh Activated Carbon type CAL granular carbon was mixed in distilled water and allowed to de-aerate for 24 hours whereupon the carbon slurry was loaded into two glass cylinders until the settled carbon bed depth was approximately 12 inches. Water in the column was drained until the liquid level was just above the carbon bed. Evaporative crystallizer mother liquor (Inventive Run 1) and clarified sodium carbonate solution (Comparative Run A) were then passed through the columns at the flow rate set forth in Table I. Approximately 15 minutes after flow through the column was established, samples of feed and effluent were taken and the flow rate was checked using a graduated cylinder and stopwatch. This procedure was repeated after 30 minutes. The results set forth in Table I indicate that about 50% of the organic impurities are removed from both solutions even though the level of organic impurities in Inventive Run 1 was four times as high as in Comparative Run A.

The invention being thus described, it will be obvious that the same may be varied in many ways. Such variations are not to be regarded as a departure from the spirit and scope of the invention, and all such modifications are intended to be included within the scope of the following claims.

TABLE I

|  | Inventive Run 1 | Comparative Run A |
|---|---|---|
| Flow Rate, ml/min |  |  |
| at 15 min. | 380 | 285 |
| at 30 min. | 290 | 320 |
| Average Residence time, min. | 1.95 | 2.12 |
| Feed, ppm C | 417 | 106 |
| Effluent, ppm C |  |  |
| at 15 min. | 188 | 51.3 |
| at 30 min. | 233 | 65.5 |
| Average ppm C Reduction, % | 49.6 | 44.9 |
| Calcium, ppm CaO |  |  |
| feed | 34 | 38 |
| at 15 min. | 42 | 40 |
| at 30 min. | 24 | 20 |
| Silica, ppm |  |  |
| feed | 473 | 173 |
| at 15 min. | 2114 | 28 |
| at 30 min. | 2165 | 58 |

What is claimed is:

1. In a continuous process for preparing sodium carbonate from crude trona by the steps of
   (a) calcining crude trona at a temperature and for a time sufficient to convert the crude trona into crude sodium carbonate;
   (b) mixing the crude sodium carbonate in an aqueous liquor to form an aqueous solution of crude sodium carbonate containing suspended insolubles and soluble organic impurities;
   (c) clarifying the crude sodium carbonate solution to remove suspended insolubles;
   (d) evaporating a portion of water from the clarified sodium carbonate solution to crystallize sodium carbonate crystals therefrom;
   (e) separating sodium carbonate crystals from the crystallizer liquor containing organic impurities; and
   (f) recycling the crystallizer liquor from step (e) to the evaporation and crystallization step (d);
the improvement which consists essentially of passing only crystallizer liquor, from step (f), containing organic impurities through an activated carbon column to reduce the level of organic impurities present in the crystallizer liquor by at least 20%.

2. The process of claim 1 wherein the crude trona is calcined at a temperature from about 150° to 350° C.

3. The process of claim 1 wherein the carbon column is a packed-bed containing activated carbon.

4. The process of claim 1 wherein the carbon column is an expanded-bed containing activated carbon.

5. The process of claim 1 wherein the carbon column removes at least 50% of the organic impurities from the crystallizer liquor.

6. The process of claim 1 wherein the separated sodium carbonate crystals are sodium carbonate monohydrate crystals which are calcined to produce dense sodium carbonate.

7. The method of claim 1 wherein sufficient organic impurities are removed from the crystallizer liquor to maintain such impurities in step d below a concentration level at which the sodium carbonate monohydrate crystal quality is adversely affected.

* * * * *